United States Patent Office 3,331,272
Patented July 18, 1967

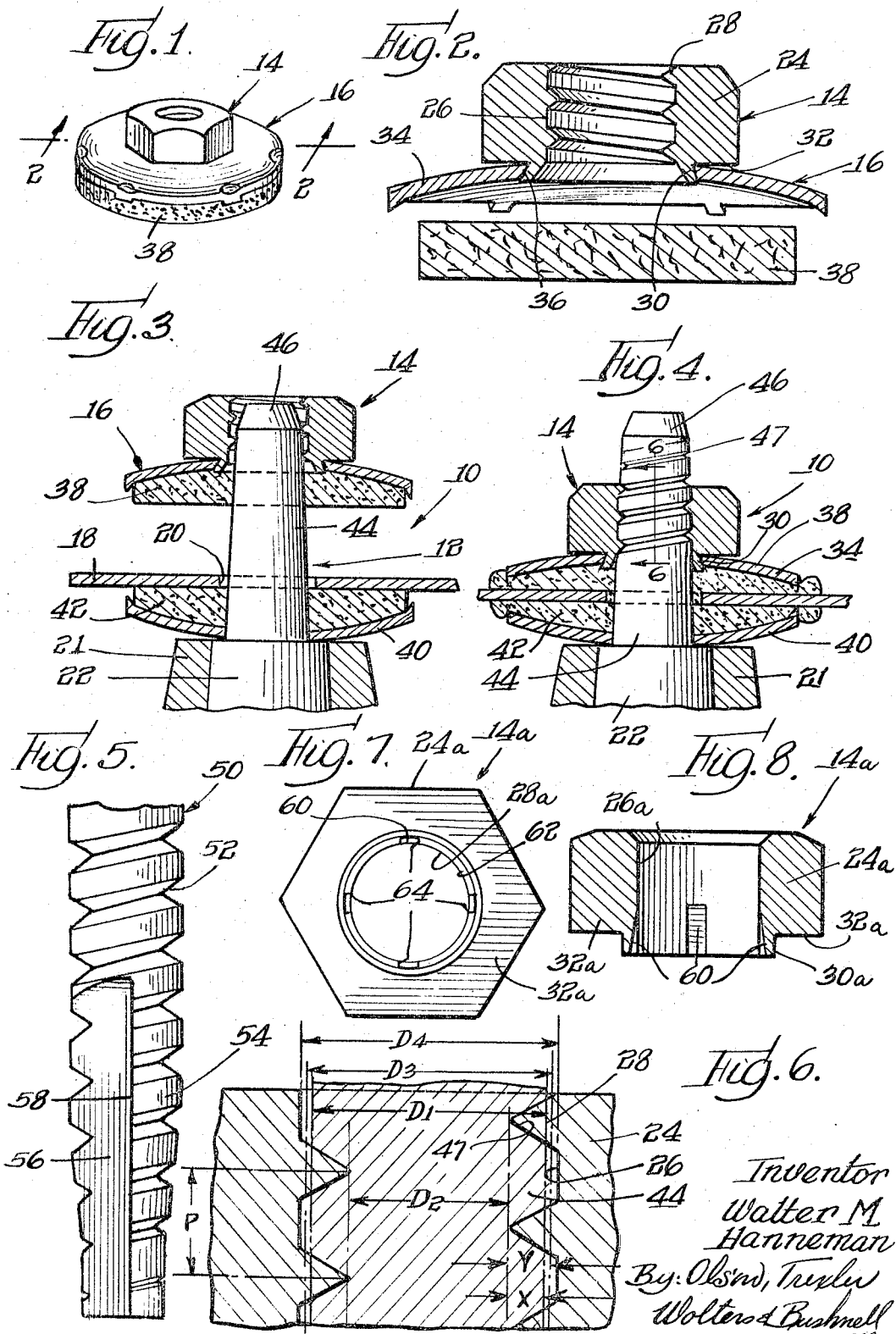

3,331,272
THREAD FORMING NUT AND TAPERED STUD
Walter M. Hanneman, Annapolis, Md., assignor to Illinois Tool Works Inc., Chicago, Ill., a corporation of Delaware
Filed May 24, 1965, Ser. No. 457,962
4 Claims. (Cl. 85—32)

The present invention relates to a novel fastener structure, and more specifically to a novel threaded fastener structure.

Various applications have been proposed for fastener structures comprising an unthreaded stud and a nut-like member adapted to be applied to the unthreaded stud. For example, one such application is found in the assembly of certain parts in an automobile. In such assemblies the stud usually passes through an aperture in one part or workpiece of the vehicle and it is frequently desired to seal the aperture against the passage of moisture or other foreign material therethrough. Problems have been encountered when heretofore proposed fasteners structures including an unthreaded stud and cooperable nut-like element have been used in that such fastener structures have frequently had insufficient holding power or have been unable to clamp the automobile parts and sealing means such as a sealing washer together with sufficient pressure to insure an effective seal.

It is an important object of the present invention to provide a novel fastener structure including an unthreaded stud and a thread forming nut member constructed so as to provide improved holding power and clamping pressure.

A further object of the present invention is to provide a novel thread forming nut member which may be easily applied to an unthreaded stud without causing injury to or breaking of the stud and in a manner providing improved holding or clamping power.

A more specific object of the present invention is to provide a novel fastener device having an unthreaded stud and cooperable nut member for securing an apertured workpiece and for more effectively sealing the aperture in the workpiece.

Other objects and advantages of the present invention will become apparent from the following description and the accompanying drawings wherein:

FIG. 1 is a perspective view showing a novel fastener device incorporating features of the present invention;

FIG. 2 is a partially exploded enlarged sectional view taken along lines 2—2 in FIG. 1;

FIG. 3 is a partial sectional view showing a fastener structure incorporating features of the present invention associated with an apertured workpiece and in a partially assembled condition;

FIG. 4 is similar to FIG. 3 but shows the fastener structure in a fully assembled condition;

FIG. 5 is a fragmentary view showing a tool for use in producing a thread-forming nut member in accordance with features of the present invention;

FIG. 6 is an enlarged fragmentary partial sectional view taken generally along lines 6—6 in FIG. 4;

FIG. 7 is an end view showing a nut member incorporating a slightly modified form of the present invention; and FIG. 8 is a sectional view showing a nut blank from which the nut member of FIG. 7 may be formed.

Referring now more specifically to the drawings wherein like parts are designated by the same numerals throughout the various figures, a fastener structure 10 incorporating features of the present invention is shown in FIGS. 3, 4 and 6. The structure 10 comprises an unthreaded stud member 12 and a nut member 14 having a sealing washer assembly 16 connected thereto. The fastener structure may be utilized for connecting a variety of workpieces together. In this embodiment the fastener structure is utilized for securing a workpiece 18 having an aperture 20 therethrough to another workpiece or part 21 to which a base portion 22 of the stud 12 is fastened.

The nut member 14 comprises a solid annular body 24 having a hexagonal or other desired peripheral configuration. The body 24 has an axially extending aperture therethrough defined by a cylindrical wall 26. A coarse helical thread 28 is formed integral with and projects inwardly from the wall 26. As shown in the drawings body 24 has sufficient axial extent so that the thread 28 includes a plurality of complete convolutions.

An annular skirt or flange 30 depends from a clamping face 32 of the nut body 24 for retaining the washer 16. As shown in the drawings, the washer 16 is formed from resilient sheet metal and has an inverted dish-shaped or domed annular body 34. An inner margin of the annular body is beveled as indicated at 36 and projects over and is retained by the outwardly flaring skirt or flange 30 of the nut. Sufficient clearance is provided between the beveled edge 36 and the flange 30 so that the washer body 34 may rotate freely relative to the nut body.

In the embodiment shown, the fastener structure is especially suitable for sealing the aperture through the workpiece. Thus a disc 38 of a soft pliable sealing compound is pressed against and adheres to the underside of the washer body 34 for sealing the workpiece aperture as shown in FIG. 4.

In order further to insure sealing of the workpiece aperture in certain installations, another washer 40 carrying a body 42 of sealing compound may be positioned on the stud 12 beneath the workpiece 18 and shown in FIGS. 3 and 4. When the fastener structure is tightened, the bodies 38 and 40 of sealing compound are forced against opposite sides of the workpiece 18 and are extruded into the workpiece aperture 20 so as to seal the aperture. The nut member 14 and the stud 12 are constructed and related with respect to each other in the manner described more in detail below so as to permit the nut member to be tightened for applying sufficient clamping pressure to the washers and the bodies of sealing material to insure sealing engagement of the material against the workpiece and extrusion of the material into the aperture 20 and positively preclude any possibility of leakage through the aperture.

The stud 12 has a smooth or unthreaded shank portion 44 preferably having a relatively sharply tapered or beveled upper end portion 46 for facilitating starting of the nut member. In the embodiment shown, the remainder of the stud shank is also slightly tapered. The nut member is formed from a material which is harder than the material of the stud shank 44. Thus when the nut member is turned onto the shank as shown in FIGS. 3 and 4, the threads 28 of the nut member iron or form complementary thread convolutions in the stud shank.

The specific construction of the nut member and the relationship between the nut member and the stud shank are shown in detail in FIG. 6. The stud shank which, as indicated above, is initially smooth or unthreaded has a predetermined maximum diameter D–1 at the area of engagement with the nut when the nut is fully tightened. The helical thread convolutions 28 are formed with sharp or V-shaped crests for facilitating entry of the threads into the stud shank when the nut is turned onto the stud. The threads 28 are formed with a minor diameter D–2 which is directly related to the diameter D–1 of the stud. The minor diameter D–2 is selected so that the threads 28 will form complementary threads or grooves 47 in the stud having a predetermined depth X which is substantially less than full depth engagement of a conventional thread form and is sufficiently small so that the torque required to turn the nut onto the stud will not exceed the stud's resistance to twisting or breaking. At the same time the depth X of thread engagement and the strength and rigidity provided by the solid nut body are such as to provide the fastener structure with sufficient resistance to stripping of the threads 28 or the threads 47 so that the device clamps the bodies of sealing material against the workpiece in the manner described above.

As previously indicated the helical thread 28 is coarse or, in other words, has a relatively long pitch P so that the convolutions are substantially spaced apart by flat portions of the wall 26 therebetween. The thread 28 is formed so that it has a pitch diameter D-3 at least substantially as great as and preferably slightly larger than the stud diameter D-1. In other words the addendum Y of the helical thread 28 is at least substantially as great as and generally slightly larger than the depth X of penetration of the thread convolution 28 into the stud shank. The diameter of the cylindrical wall 26 or, in other words, the major diameter D-4 of the nut member only slightly greater than either stud diameter D-1 or the pitch diameter D-3 so that there is a very narrow clearance between the wall 26 and the stud shank and maximum support is provided for the helical thread 28.

In FIG. 5 there is shown a tool or tap 50 for forming the threads 28 of the nut member 14. The tap is provided with a helical groove 52 having the same pitch as the thread 28 and having a minor diameter substantially equal to the minor diameter of the threads 28. The groove 52 has a V-shaped transverse cross section with a substantially minimum radius at the bottom thereof or in other words with the junction between the opposite sides thereof so as to promote the formation of the thread 28 with a sharp V-shaped crest. The tool has a maximum diameter equal to the diameter D-4. An entering end portion 54 of the tap is tapered for facilitating starting into the nut and is provided with a longitudinally extending recess 56 which intersects the periphery of the tap at a cutting edge 58 for cutting the thread convolutions as the tap is turned into the nut blank.

FIGS. 7 and 8 show a slightly modified form of the present invention as indicated by the application of identical reference numerals the suffix *a* to corresponding parts. These figures show only the nut member of a fastener structure, but it is to be understood that this nut member may be connected with a sealing washer assembly and applied to an unthreaded stud in the same manner as the nut member described above.

In FIG. 8 the nut member 14a is shown in a partially completed condition and prior to the formation of the thread convolutions therein. This nut member blank differs from the blank of the nut member described above in that it is provided with one or more axially extending and outwardly tapering notches or grooves 60 in the wall 26a and adjacent the clamping side of the nut. When the nut member blank of FIG. 8 is formed with thread convolutions 28a as shown in FIG. 7, the grooves 60 provide notches in the endmost thread convolution 62 adjacent the clamping face 32a of the nut. These notches or interruptions in the endmost thread convolution provide edges 64 which act as cutting edges for aiding in the forming of complementary thread convolutions on the stud shank when the nut member is applied to the shank.

While a preferred embodiment of the present invention has been shown and described herein, it is obvious that many structural details may be changed without departing from the spirit and scope of the appended claims.

The invention is claimed as follows:

1. A thread forming nut adapted to be applied to an unthreaded stud having a predetermined diameter and at least a portion of the free end of said stud being tapered, said nut comprising a solid annular body having a substantially cylindrical inner wall of subsantially uniform diameter throughout its length, and a course helical internal thread having a plurality of convolutions integral with and projecting inwardly from said wall, said helical thread convolutions having substantially sharp V-shaped crests for facilitating formation of complementary threads in the stud, said thread convolutions having a minor diameter less than said predetermined stud diameter, said minor diameter being substantially constant throughout the axial extent of said thread convolutions, said thread convolutions further having a predetermined addendum and a pitch diameter at least as substantially great as said stud diameter so that said thread convolutions will engage said stud to a depth not substantially greater than said addendum, said cylindrical wall having a diameter similar to and slightly greater than said stud diameter and not substantially greater than said pitch diameter and at least substantially reducing any dedendum of the thread convolutions, said addendum being substantially greater than one-half the difference between said stud diameter and said wall diameter, said cylindrical wall between adjacent convolutions of thread being substantially parallel to said axis and having an axial extent equal to or greater than the axial extent of the root portion of the thread convolutions when measured along said cylindrical wall, and said annular body heaving a radially extending clamping face at one end thereof.

2. A thread forming nut, as defined in claim 1, wherein said addendum is greater than said depth of engagement.

3. A thread forming nut, as defined in claim 1, wherein said clamping face has annular flange means projecting from said clamping face adjacent one end of said cylindrical wall, an annular dished sheet metal material washer disposed beneath said clamping face and having an inner margin adjacent said cylindrical flange means, said cylindrical flange means projecting beneath said margin and retaining said washer and body in assembled relationship.

4. A thread forming nut, as defined in claim 3, wherein said washer has a disc of soft pliable sealing material disposed beneath and secured to said washer.

References Cited

UNITED STATES PATENTS

| 2,723,584 | 11/1955 | Parker | 85—32 |
| 2,761,349 | 9/1956 | Heller | 85—32 |
| 2,896,495 | 7/1959 | Crawford | 85—32 |
| 2,943,661 | 7/1960 | Stern | 85—32 |
| 3,016,941 | 1/1962 | Coldren | 151—38 |
| 3,137,196 | 6/1964 | Stawinski | 85—32 |
| 3,164,055 | 1/1965 | Duffy | 85—32 |
| 3,234,986 | 2/1966 | Welles | 85—32 |

FOREIGN PATENTS

| 413,027 | 7/1934 | Great Britain. |
| 929,807 | 6/1963 | Great Britain. |

CARL W. TOMLIN, *Primary Examiner.*

THOMAS F. CALLAGHAN, *Examiner.*

M. PARSONS, JR., *Assistant Examiner.*